United States Patent [19]

Bruhn et al.

[11] 4,445,272

[45] May 1, 1984

[54] METHOD AND APPARATUS FOR STACKING ROTOR BLANKS ON A SHAFT

[75] Inventors: Peter H. Bruhn, Round Rock; Rolf Wustrau, Austin, both of Tex.

[73] Assignee: International Business Machines Corporation, Armonk, N.Y.

[21] Appl. No.: 438,440

[22] Filed: Nov. 2, 1982

Related U.S. Application Data

[63] Continuation-in-part of Ser. No. 159,760, Jun. 16, 1980, abandoned.

[51] Int. Cl.³ .................................................. H02K 15/02
[52] U.S. Cl. ....................................... 29/598; 29/564.2; 29/564.6; 29/736; 29/738; 83/108; 310/42; 310/216
[58] Field of Search .................. 29/596, 598, 732, 736, 29/738, 564.2, 564.6; 72/326, 327, 329; 83/108, 25; 310/92, 216, 217

[56] References Cited

U.S. PATENT DOCUMENTS

| | | | |
|---|---|---|---|
| 317,789 | 5/1885 | Horton | 83/108 |
| 2,975,312 | 3/1961 | Ploran | 310/217 |
| 3,189,984 | 6/1965 | Haifley et al. | 29/732 X |
| 3,202,851 | 8/1965 | Zimmerle et al. | 310/259 |
| 3,203,077 | 8/1965 | Zimmerle | 29/598 |
| 4,110,895 | 9/1978 | Mitsui | 29/564.2 |
| 4,383,356 | 5/1983 | Fichtner | 29/598 |

*Primary Examiner*—Carl E. Hall
*Attorney, Agent, or Firm*—Andrea P. Bryant

[57] ABSTRACT

A method of, and an apparatus for, constructing a laminated rotor for use in high speed stepping motors or the like. The apparatus consists of a rotatable carousel having a plurality of rotatable work stations each of which is carried to a plurality of operating stations. Lamina are punched from sheet metal stock and brought back into the stock and held in a friction fit. Sheet stock is then advanced to a stacking station where a lamina is forced onto a rotor shaft. The shaft is rotated thereafter in order to uniformly distribute any local metalurgical or planarity inconsistencies in the sheet stock throughout the laminated structure.

8 Claims, 9 Drawing Figures

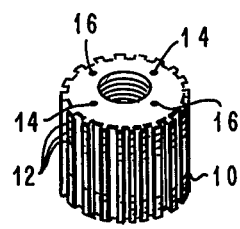
FIG. 1
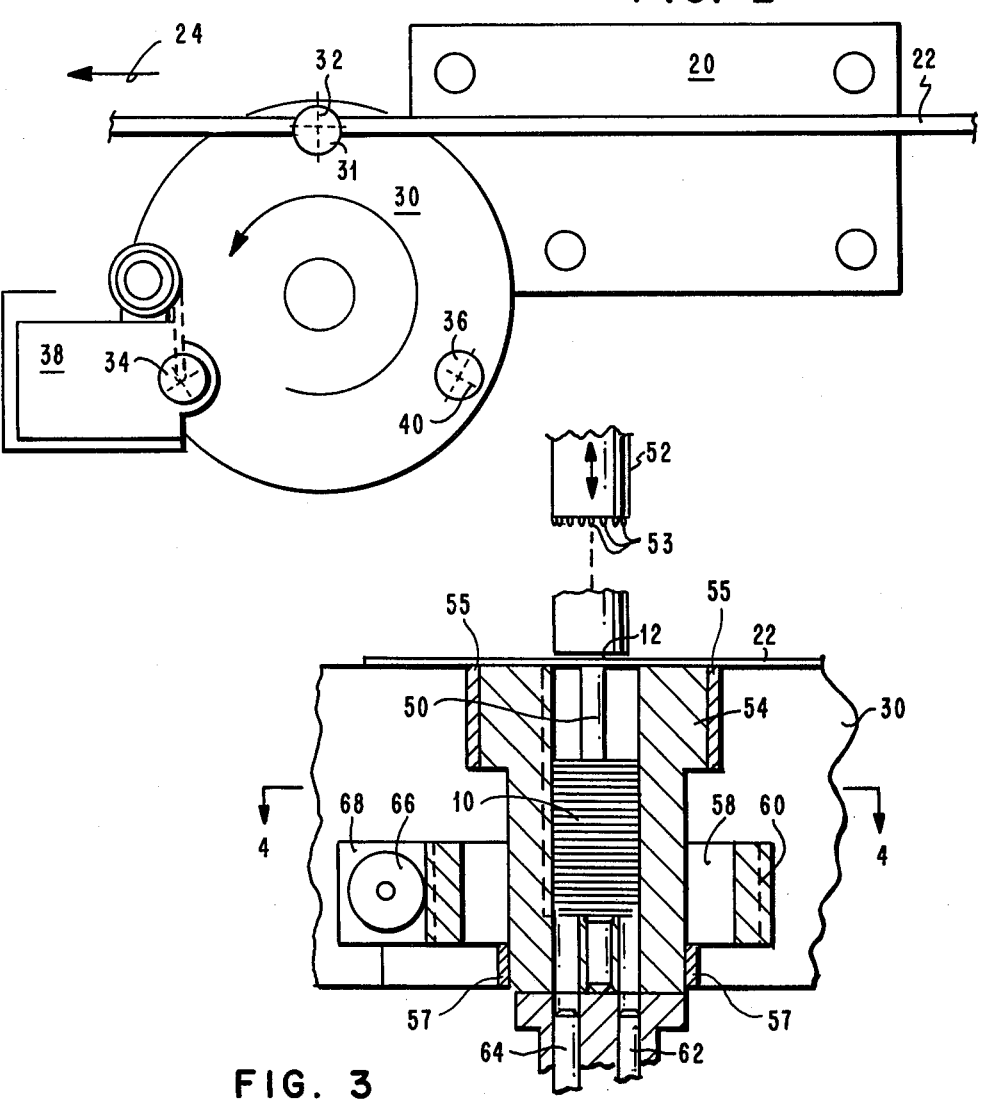
FIG. 2
FIG. 3

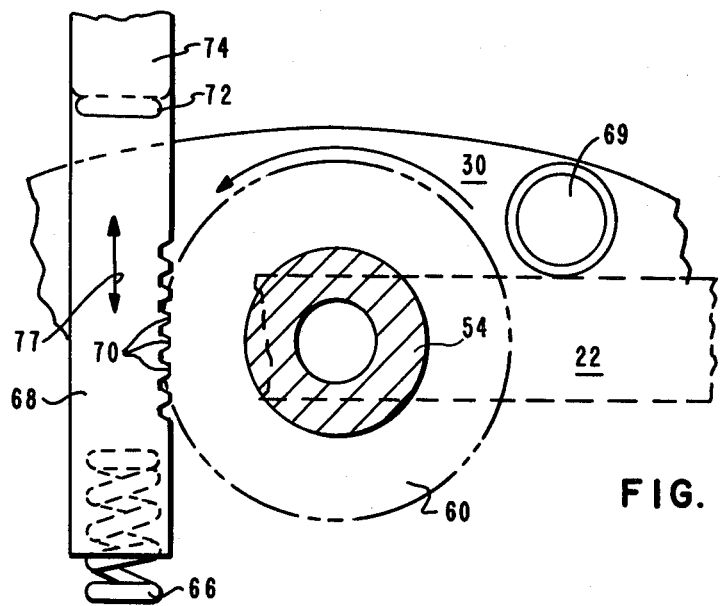
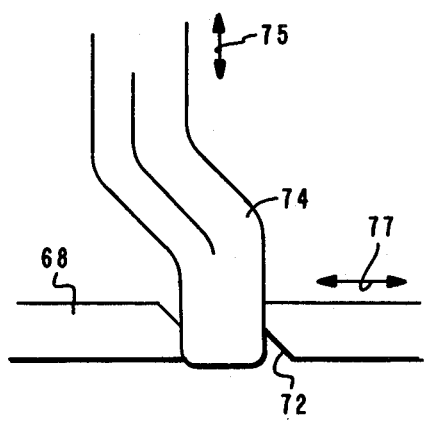
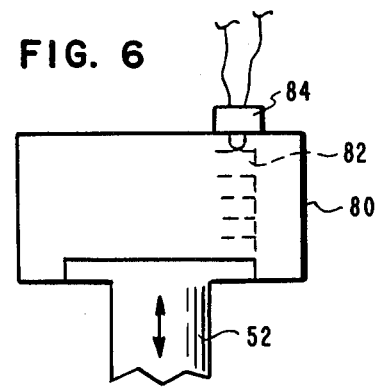
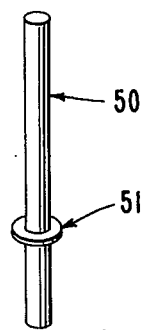
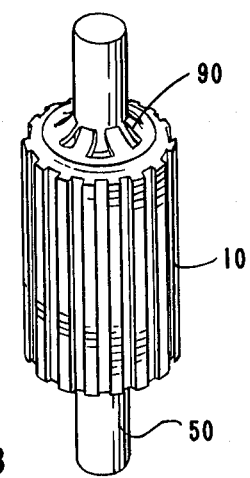

METHOD AND APPARATUS FOR STACKING ROTOR BLANKS ON A SHAFT

DESCRIPTION

This is a continuation in part of application Ser. No. 159,760 filed 16 June 1980, now abandoned.

CROSS-REFERENCE TO RELATED APPLICATION

U.S. patent application Ser. No. 159,701, filed 16 June 1980, and now abandoned entitled "Laminated Stator Structures", commonly assigned, and having R. Wustrau as inventor.

TECHNICAL FIELD

This invention relates to the manufacture of laminated dynamoelectric motor structures.

In particular, it pertains to assembling laminated rotors from sheet metal stock.

BACKGROUND

Prior art relating to the manufacture of laminated dynamoelectric structures includes:

(a) U.S. Pat. No. 4,110,895 to Mitsui which teaches apparatus for forming a stack of interlocking laminations which apparatus may be arranged to index laminations relative to each other; and (b) U.S. Pat. No. 3,202,851 to Zimmerle et al relates to forming stacked interlocked laminations for dynamoelectric machines from sheet metal stock.

Each of the above patents disclose die apparatus having a plurality of stations for in seriatim operation for forming individual laminae.

U.S. Pat. No. 2,975,312 to Ploran relates to correspondingly formed projections and openings in adjacent laminae for interlocking a stack of laminae without a separate fastening element.

Other patents relating to this technology include U.S. Pat. No. 3,203,077 to Zimmerle, U.S. Pat. No. 3,189,984 to Haifley et al and U.S. Pat. No. 317,789 to Horton.

DISCLOSURE OF INVENTION

These and other objects and advantages are achieved with our method and apparatus. Briefly, we provide a progressive punch with a plurality of stations for forming lamina of desired configuration from sheet stock. Each lamina is then returned to the sheet stock for travel therewith. Immediately adjacent the progressive die we provide a rotatable carousel carrying a plurality of stations at which laminations may be stacked.

A stack of laminations is formed at a first station on a rotor shaft. Further rotation of the carousel brings the just formed stack to the next work station where a keeper clip unifies the shaft-stack assembly. The last station in our preferred embodiment is a removal station at which the operator can remove the just formed stack assembly and insert a shaft for receiving another stack in station position 31. The generation of the rotor assembly is progressive and continuous resulting in one complete assembly for every index of the three station carousel.

BRIEF DESCRIPTION OF THE DRAWING

The foregoing and other objects, features, and advantages of our invention will become apparent from the following, more particular description of a preferred embodiment, as illustrated in the accompanying drawing wherein:

FIG. 1 is a representation of an assembled laminated rotor stack.

FIG. 2 is a top view of apparatus embodying our invention.

FIG. 3 is a cross-sectional view of the punch and stack station.

FIG. 4 is a sectional view along line 4 of FIG. 3 showing means for indexing the developing stack.

FIG. 5 is a cross-sectional view of cam 74 and rod 68 of FIG. 4.

FIG. 6 shows a technique for detecting the height of a lamina stack.

FIG. 8 shows a completed stack on shaft 50 after removal at station 40.

FIG. 9 shows a stack receiving shaft 50.

BEST MODE FOR CARRYING OUT THE INVENTION

Figure 7:
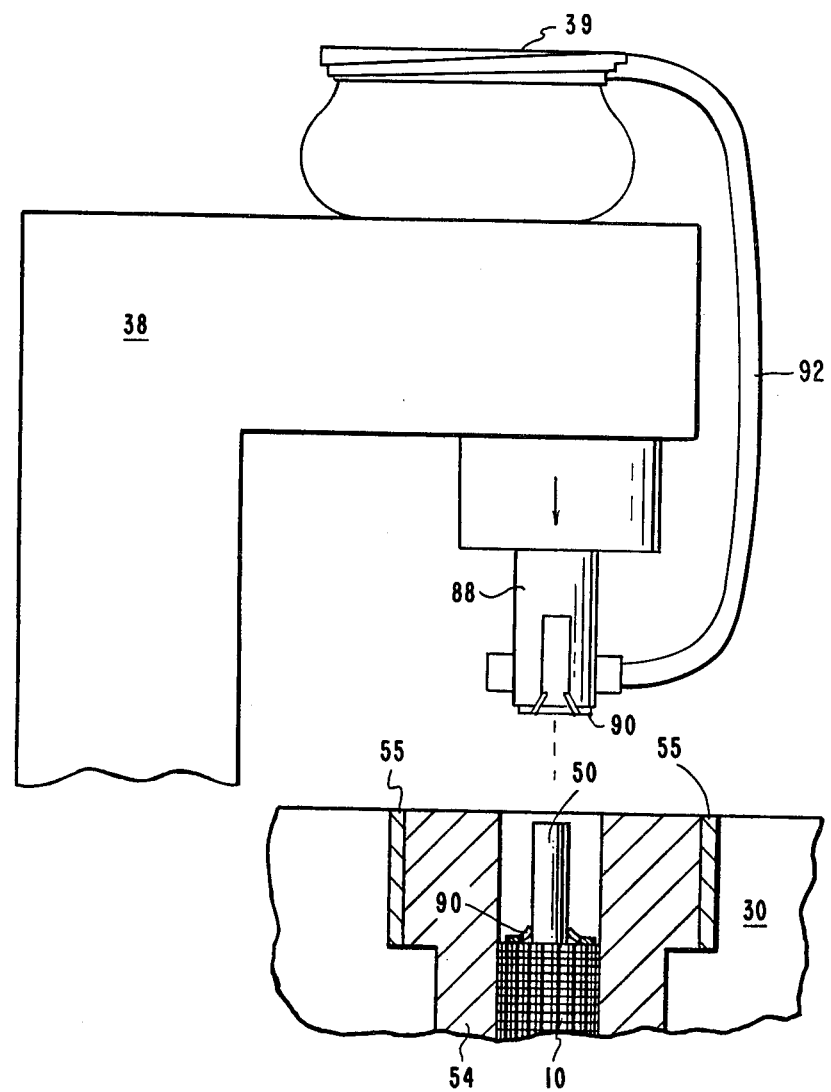
FIG. 7 is a side view of the press at operating station 38 in FIG. 2.

Referring now to FIG. 1, a stack structure 10 is shown comprising a plurality of individual lamina 12 which together make up a rotor stack for a dynamoelectric machine, in particular a high speed stepper motor. Each lamina 12 is illustrated having alternatingly placed two holes 14 and two correspondingly shaped projections 16. Each lamina is radially displaced 90° to cause the engagement of holes to projections. While two each, holes and projections, have been shown it is obvious to those skilled in the art that other spacings may be chosen. In the diagrammatically simplified view of FIGS. 3 through 8, stack 10 is not shown in as great detail.

In FIG. 2 progressive die 20 includes a plurality of forming stations (not shown) for forming individual laminae 12 from sheet stock 22. Sheet stock 22 is moved progressively through progressive die 20 in a conventional manner by means not shown in the direction of arrow 24. Carousel 30 is provided with three work fixture stations 31, 34, and 36. As carousel 30 rotates, work fixture stations 31, 34 and 36, which are positioned at evenly spaced intervals thereabout, sequentially move past three operation areas 32, 38, and 40. The locations of operation areas 32, 38 and 40 are indicated generally in FIG. 2.

Apparatus for stacking the individual laminae 12, formed in sheet stock 22, and forming stack structure 10 is present at location 32. This stacking apparatus will be described in detail with reference to FIG. 3.

A clip assembly station, including a small press for applying a one way clip from source 39 to a shaft on which laminae 12 have been stacked, for maintaining stability of the stack during any subsequently desired operations, is represented generally at 38.

As explained in greater detail in co-pending application Ser. No. 446,792 projections 16 and holes 14 cooperate to maintain adjacent lamina in an interlocked manner. Each lamina is connected to its neighbor. Thus, stack 10 is relatively stabilized and an additional clip operation may not be necessary to hold stack 10 in position on a shaft. The clip assembly station 38 is discussed in greater detail below, having reference to FIG. 7.

Indicated generally at 40 is the location where stack removal occurs. It is here that an operator must intervene to remove a complete lamina stack 10 from carousel 30. A new receiving shaft is then inserted in the now empty work fixture station (36 in FIG. 2) in carousel 30. A suitable receiving shaft 50, having a shoulder 51 is shown in FIG. 9.

FIG. 3 illustrates how at operation area location 32 an individual lamina 12 formed in sheet stock 22 is dislodged therefrom and added to a developing stack 10 around operator removable stack receiving shouldered shaft 50 located in any given work fixture station 31, 34, and 36 in carousel 30.

All structure illustrated in this partial cross-section of carousel 30 is present at each work fixture station 31, 34, and 36. Each work fixture station is identical so that the only sequence requirements are those imposed by the direction of rotation of carousel 30 past the operation areas 32, 38 and 40.

Blanking punch 52 is provided to dislodge and press an individual lamina 12 from sheet stock 22 onto shaft 50. Shaft 50 is removably slip fit in sleeve member 54 which is rotatably mounted within carousel 30 by means of bearings 55 and in lower bearing plate member 56 (within carousel 30) by means of bearings 57. Surrounding the lower portion of sleeve member 54 is one way clutch 58 and gear 60 which are provided to allow precisely indexed rotation of sleeve member 54. Sleeve member 54 is dimensioned to cause a friction fit of stack 10 therein. Thus a stack assembly 10 being formed on shaft 50 is advanced radially.

Knockout rods 62 and 64 are provided to aid in the removal of stack assembly 10 at stack removal operation area 40 (FIG. 2) after it has reached completion. When stack 10 has been formed to a predetermined height as detected using a technique such as that described in connection with FIG. 6, the operator manually raises knock-out rods 62 and 64 to overcome the friction fit of stack 10 within sleeve member 54.

Also seen in FIG. 3 is an end view of return spring 66 biased rod 68, for rotating sleeve member 54. Rod 68, which can be seen more clearly in FIG. 4, is provided with teeth 70 for engaging gear 60 which surrounds sleeve 54. It will be recalled that in FIG. 1 there were two holes 14 and two projections 16 alternatingly spaced about each individual lamina 12. Therefore, it can be seen that for this particular embodiment it is necessary to rotate the developing stack 10 90° between each lamina addition to the stack in order to properly align the protrusions and holes in adjacent laminae. As earlier mentioned, if other spacings for holes and projections are desired, then obviously the amount of rotation would be correspondingly adjusted. Gear 60 is driven by bar 68 through one way clutch 58 approximately 90°. Motion is imparted to bar 68 by means of dog leg cam 74 co-acting with camming surface 72.

Also shown in FIG. 4 is shot pin 69 which locks carousel 30 in position after each index of the carousel. Carousel 30 is indexed only after sufficient laminae to complete an entire stack 10 have been pushed on to a shaft 50 at operation area 32.

FIG. 5 shows cam 74 and rod 68 in cross-section. Cam 74 may be moved in the directions indicated by arrows 75 in any chosen manner to impart motion in directions indicated by arrows 77 to bar 68. It is to be appreciated that this design of bar 68 and gear 70 is for illustration purposes only and that other techniques for accurately indexing developing stack 10 on shaft 50 in sleeve 54 may be employed.

A brief description of the operation of the present invention follows. Referring to FIG. 2, a strip 22 of stock material advances through progressive die 20 in the direction indicated by arrow 24 until a blanked, and strip carried, lamina 12 is positioned over a shaft 50 of a carousel mounted work station (31, 34 or 36) as shown in FIG. 3. Punch 52 is actuated to press lamina 12 down onto developing rotor stack assembly 10. Punch 52 has teeth 33 provided about its lower periphery. These teeth correspond in number and spacing to those desired for the resulting rotor.

When the steps of advancing, punching, and stacking and rotating the stack at operation area 32 have been repeated a sufficient number of times to attain the desired height of stack 10, carousel 30 rotates counterclockwise, as indicated in FIG. 2. It is, of course, within the skill of the art to employ any of numerous techniques to detect the achievement of a predetermined height. For example, a means for counting the lamina forced on the shaft may be used. It would be a matter of choice, in the alternative to position a sensor to detect height. Such an exemplary technique is illustrated in FIG. 6.

FIG. 6 shows the upper portion of operation area 32 (FIG. 2) which includes the upper portion of punch 52 and its housing 80. As each lamina 12 is added to stack 10 the downward distance which can be travelled by punch 52 decreases so that the uppermost part of punch 52 reaches the positions 82 shown in phantom, until such time as contact sensor 84 is actuated by contact with the upper portion of punch 52. In a conventional manner, contact sensor 84 is connected to machine controls so that carousel 30 is rotated counterclockwise to bring the stack 10, still within sleeve member 54, to the clip applying operation area 38.

Stack structure 10 in work fixture station 31 formed at operation area 32 is indexed to the location of operation area 38, the clip applying station formerly occupied by work fixture station 34. There, a press is actuated to attach a one way clip on shaft 50. FIG. 7 shows a side view of the press located at operation area 38 (FIG. 2). Suitable one-way clips 90 are maintained in supply bowl 39. The clip applying manipulator 88 applies a clip 90 to the top of stack 10 on shaft 50 in rotatable shaft holding sleeve member 54 in carousel 30. Manipulator 88 may conventionally have a pneumatic or a magnet device or other gripping means for extracting a clip from escapement conveyor tube 92 and applying it to shaft 50.

As carousel 30 rotates, work fixture station 34 is carried to operation area 40, the rotor removal/shaft insertion station. An operator performs those steps as earlier described in connection with FIG. 3 and our apparatus is ready for the next cycle.

While the invention has been particularly shown and described with reference to a preferred embodiment, it will be understood by those skilled in the art that the above mentioned and other changes in form and detail may be made without departing from the spirit and scope of the invention.

We claim:

1. A method of manufacturing a uniform stepper motor rotor of a predetermined stack height from laminae with apparatus including a lamina punch for punching laminae from sheet stock strip, a rotatable carousel having a plurality of rotatable work stations each carrying a rotor shaft, and a work station punch, said method comprising:

(a) punching a lamina from said stock strip with said lamina punch and returning said lamina to said stock strip;

(b) advancing said stock strip to one of said work stations;

(c) punching said previously punched lamina from said stock strip and forcing said lamina onto said shaft;

(d) rotating said shaft for each lamina forced onto said shaft;

(e) repeating steps a through d until said predetermined stack height is achieved; and (f) rotating said carousel upon completion of said rotor stack.

2. The method of claim 1 including the additional step of placing a one way clip on said shaft to maintain laminae position.

3. The method of either of claims 1 or 2 including also the step of sensing the height of the laminae accumulating on the shaft to determine completion of said rotor.

4. In combination, apparatus for assembling on a shaft a laminated rotor comprising laminae fabricated from sheet stock including:

a progressive die for forming interlockable laminae from and returning said laminae to said sheet stock;

a blanking/stacking location at which is provided apparatus for punching from the sheet stock each lamina and stacking it on said shaft;

a clip assembly location at which is provided apparatus for applying a clip for temporarily holding a stack in stable alignment; and a removal location where a completed rotor is removed and a new shaft provided.

5. The apparatus of claim 4 wherein the blanking/stacking location, clip assembly location, and removal location are positioned about the periphery of a rotatable carousel.

6. The apparatus of claim 5 wherein said carousel includes a plurality of work fixture stations each able to accept a shaft on which the laminated rotor is assembled.

7. The apparatus of any of claims 4, 5 or 6 wherein the apparatus provided at said blanking/stacking location further includes means for rotating said shaft a predetermined distance.

8. The apparatus of claim 7 wherein said predetermined distance is determined by the distance between adjacent holes and projections formed on each individual lamina in said progressive die.

* * * * *